INVENTOR.
Mikio Ito
Shohei Hoshino
BY
Oldham and Oldham
attys

United States Patent Office 3,528,601
Patented Sept. 15, 1970

3,528,601
TEARING TAPE MEANS FOR TUBULAR FILM PACKAGE
Mikio Ito and Shohei Hoshino, Suzuka-shi, Japan, assignors to Asahi Dow Limited, Chiyoda-ku, Tokyo, Japan
Filed July 1, 1968, Ser. No. 741,357
Claims priority, application Japan, July 7, 1967, 42/58,299
Int. Cl. B05d 33/00
U.S. Cl. 229—66                    3 Claims

ABSTRACT OF THE DISCLOSURE

A tearing tape is welded to the film casing of a tubular package of meat, sausage or other paste-like or semi-fluid material adjacent to one end thereof and extends crosswise of the package in a plane normal to its longitudinal axis. By pulling off the tape, the package can conveniently be opened at the end enabling smooth delivery of its content through the end opening. Any rushing out of the content previously unavoidable at the instant when the package is opened can be effectively avoided.

---

Figure 1:
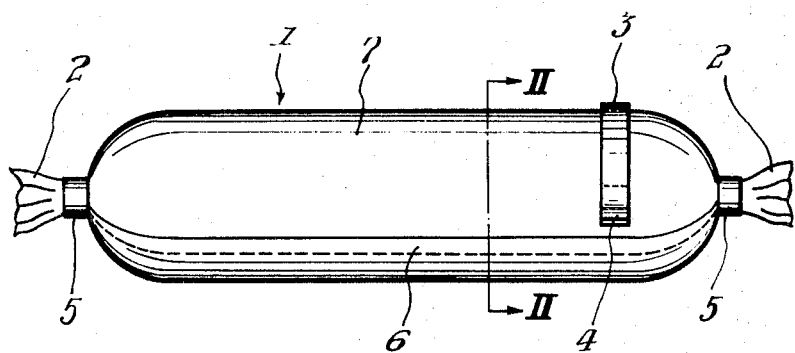

This invention relates to tubular film packages of meat, liver sausage and other paste-like, jelly or semi-fluid food products employing a tubular film casing of vinylidene chloride or the like synthetic resin and more particularly to film tearing means for opening such packages.

Vinylidene chloride base synthetic resins in film form are widely used in the packaging of different foods including not only meat or similar products in paste-like form such as liver sausage but also a variety of Japanese-style foods in gel, paste-like or semi-fluid form since they are excellent as a packaging material for such paste-like or fluent materials owing to their advantageous characteristics including impermeability to moisture and gases, transparency and shrinkability.

On the other hand, the vinylidene chloride resin film as a packaging material involves the deficiency that the package formed of such film is ordinarily hard to open and the packaged material cannot be taken out of the casing with efficiency.

In general, the vinylidene chloride base resin film is inherently easy to tear once cut or otherwise injured at the starting point of such tear because of its oriented crystalline structure but where no cutter or similar tool is available at hand it is almost impossible to form a cut or other tear-starting flaw in the film.

To overcome this situation, proposals have recently been made to weld a tearing tape to the outside of the film tube or casing of the package thereby to enable it to be opened without use of any cutting device. According to any of the proposals previously made, the tearing tape is welded to the film casing of a package so as to extend longitudinally thereof at right angles to the clip bands normally used on the package to seal it at its opposite ends and includes a free tape portion serving as a finger grip for use in pulling the tape to tear the casing film longitudinally along the body of the package. It has been found, however, that such tearing device is not satisfactory as it allows the content of the package to rush out of the casing when the latter is torn open particularly in cases where the content is of fluent or gel form.

The present invention has for its object to provide an opening structure for tubular film packages of the kind described which is free from the deficiency described above.

Another object of the present invention is to provide a tubular resin film package with tearing tape means conveniently usable to open the package crosswise thereof and adjacent to one of its sealed ends.

Yet another object of the present invention is to provide such tearing tape means with one or both of the tape ends extending free from the body of the package to serve as a finger grip conveniently usable to pull off the tape thereby to open the package.

A further object of the invention is to provide tearing tape means which eliminates even in cases where the content of the package is of fluent or semi-fluid form the danger that the content spill out wastefully when the package is opened.

Still another object of the invention is to provide tearing tape means on a tubular film package which makes it possible readily to form an opening in the film casing of the package at one end thereof and thus to force out the content of the package through such end opening simply by depressing or squeezing the package by hand and without allowing any finger to contact the material being thus extruded.

Figure 2:
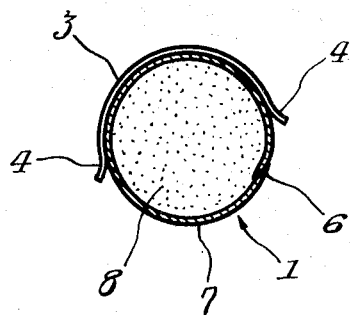

These and other objects, features and advantages of the present invention will become apparent from the following description when taken in conjunction with the accompanying drawing, which illustrates one preferred embodiment of the present invention and in which:

FIG. 1 is a side view of a tubular film package carrying an opening structure according to the invention; and FIG. 2 is a cross sectional view taken along the line II—II in FIG. 1.

Referring to the drawing and particularly to FIG. 1, the packaged product 1 shown includes a tubular film casing formed of a web of film 7 of vinylidene chloride or other thermoplastic synthetic resin by overlapping the longitudinal marginal edges of the web and welding them together in any well-known manner with a paste-like or semi-fluid material 8 such as ham or sausage filled in the tubular film casing. As is conventional in the art, closure bands 5 are fitted to the opposite ends 2 of the package and clinched prior to the severing of the filled tube into individual packages.

According to the present invention, the tubular film package 1 carries a tearing tape 3 of relatively limited width which is welded to the outside of the tubular film casing 7 adjacent to one of its opposite ends sealed by the respective closure bands 5 and extends crosswise of the package 1 in a plane extending at right angles to the longitudinal axis of the package 1. As clearly shown in FIG. 2, the opposite tape end portions 4 each limited ing length are left free from the casing film 7 conveniently to serve as a finger grip piece. If desired, one of the opposite tape ends may be welded to the film casing in the same manner as the major intermediate portion of the tape.

The tearing tape 3 including free end portions 4, is preferably made of the same thermoplastic material as the tubular film casing 7, for example, vinylidene chloride resin and the welding of such tape to the casing film 7 can conveniently be performed with an appropriate heating means employing high-frequency current induction between internal and external electrodes, as is well known in the art. If desired, the tearing tape may be imprinted on its surface with markings, for example, indicating the date of manufacture of the packaged product.

The tubular film package 1 has a longitudinally extending seam 6 provided in the web of film 7, as shown in the drawings.

To open the tubular film package 1 described above, one grip end 4 of the tape 3 is held between the fingers and pulled outwardly of the casing until the major portion of the tape welded thereto is torn off together with the adjacent casing film portion thereby to open the package crosswise adjacent to its end.

The tape 3 does not contact the seam 6.

During this procedure, it will be apparent that any loss of the packaged material can be effectively prevented even in cases where the content material is of fluent or semi-fluid form as long as the package is held upright with its taped end directed vertically upward since the package is opened crosswise in a horizontal plane including the tape axis.

The opening structure of the present invention is also advantageous from the standpoint of sanitation on account of its arrangement designed to open the package crosswise adjacent to one of its opposite ends and which makes it possible to smoothly deliver the content out of the package through its end without allowing any direct contact of the fingers with the material being delivered. For example, in the case of a package filled with meat, sausage or other paste-like material, the content can be freely delivered out of the package once the latter has been opened, simply by depressing and squeezing the package by hand toward its opened end through the medium of the tubular casing film 7. In addition, it will be apparent that the tubular casing opened at one end can serve as a container for the packaged material as desired. It will of course be apparent to those skilled in the art that the invention is not restricted to the features described above and shown in he drawing but may be varied in many ways within the scope of the appended claims.

What is claimed is:

1. In a tubular film package of the type including a tubular casing of synthetic resin film encasing the packaged material and constricted at the opposite ends by closure band means, tearing tape means for opening the package comprising a length of tape of pliable material welded to the outside of the tubular film casing and extending only partly therearound adjacent to one of the closure bands and extending crosswise of the package in a plane substantially at right angles to the longitudinal axis thereof with both end portions of the tape left free from the tubular film casing to serve as finger grips.

2. A tubular film package as in claim 1 where said tape means and said resin film both are formed from vinylidene chloride, and said tape means is heat sealed to said resin film.

3. A tubular film package as in claim 1 where said tubular casing has a longitudinally extending seam therein, and said tearing tape means is not in contact with said seam and engages a continuous uniform layer of said film.

References Cited

UNITED STATES PATENTS 2,897,087   7/1959   Lawlor.

FOREIGN PATENTS 139,139   10/1950   Australia.

JOSEPH R. LECLAIR, Primary Examiner

J. M. CASKIE, Assistant Examiner

U.S. Cl. X.R.

206—56; 229—51